United States Patent

Virsberg

[15] 3,641,587
[45] Feb. 8, 1972

[54] MEANS FOR RECORDING TRANSIENT VOLTAGES

[72] Inventor: Lars-Goran Virsberg, Vasteras, Sweden
[73] Assignee: Allmanna Svenska Elektriska Aktiebolaget, Vasteras, Sweden
[22] Filed: Dec. 22, 1969
[21] Appl. No.: 887,047

[30] Foreign Application Priority Data

Feb. 24, 1969 Sweden..................................2492/69

[52] U.S. Cl..................346/74 MC, 179/100.2 C, 324/103 P, 324/112, 336/96, 336/205, 336/231, 346/74 M
[51] Int. Cl..................G01r 19/16, G11b 5/12, H01f 27/40
[58] Field of Search..................324/103 P, 112, 126, 133; 336/96, 205, 105, 231; 346/74 M, 74 MC; 179/100.2, 100.2 C

[56] References Cited

UNITED STATES PATENTS

| 1,774,821 | 9/1930 | Baruch | 179/100.2 C |
| 2,434,933 | 1/1948 | Kinyon | 324/103 P |
| 3,230,517 | 1/1966 | Supernowicz | 179/100.2 C |
| 3,235,790 | 2/1966 | Collins | 336/105 |
| 3,251,014 | 5/1966 | Stein | 336/96 |
| 3,529,304 | 9/1970 | Crandall | 346/74 M |

Primary Examiner—Terrel W. Fears
Assistant Examiner—Howard W. Britton
Attorney—Jennings Bailey, Jr.

[57] ABSTRACT

For recording overvoltages in a high-voltage network a coil is used wound on a nonmagnetic, insulating frame providing with a double conical space for the winding. The coil is provided with an axial hole through which a magnetic tape is drawn. The coil is connected to the network over a voltage divider and the coil, together with a series resistor, is cast into a block to form a compact unit.

2 Claims, 4 Drawing Figures

INVENTOR
LARS-GORAN VIRSBERG,

3,641,587

MEANS FOR RECORDING TRANSIENT VOLTAGES

PRIOR APPLICATIONS

This application is a division of application Ser. No. 853,120 filed Aug. 26, 1969 in the name of Ake Jakobsson and Lars-Goran Virsberg, for Means for Recording Transient Voltages.

BACKGROUND OF THE INVENTION

1. Field of the Invention

The present invention relates to a means for recording transient overvoltages in a high voltage network, said means comprising an electromagnetic member which is connected to the network and which influences a magnetic tape.

2. The Prior Art

In connection with recording transient overvoltages in a network it is known to use a ferromagnetic tape influenced by an electromagnetic member, for example in the form of a wound coil through which the tape is passed at low speed. The tape may be premagnetized in a certain way or magnetically homogeneous so that an overvoltage above a certain level causes demagnetization or remagnetization of the tape at a point and the width of the demagnetized or remagnetized area provides a measurement of the amplitude of the overvoltage. The overvoltage is transmitted from the network to the coil, for example, through a voltage transformer or a voltage divider of some sort.

In order to make the recording device sensitive to the amplitude it is connected to such a great resistance that the inductance of the coil will be negligible in comparison. The tape may also be moved at a constant low speed or intermittently with suitable intervals in relation to the occurrence of the transient overvoltages to be recorded.

SUMMARY OF THE DISCLOSURE

Application Ser. No. 853,120, referred to above, shows an electromagnetic member constructed as a coil wound onto an insulating frame with a hole in the middle through which the tape is passed, and provided on the outside with a double conical space for the winding, shaped so that the magnetic field strength along the axis of the coil decreases symmetrically towards the ends of the coil.

According to the present invention, the coil, together with a series resistor is cast into a block of insulating material to form a compact unit.

BRIEF DESCRIPTION OF THE DRAWINGS

The invention will be further described with reference to the accompanying drawings where FIG. 1a shows in side elevation and FIG. 1b in end view the structure of the coil frame according to such prior application while FIG. 2 shows how, according to the present invention, a coil with a connecting resistor can be arranged cast in a block, while

DESCRIPTION OF THE PREFERRED EMBODIMENTS

Figure 1A:
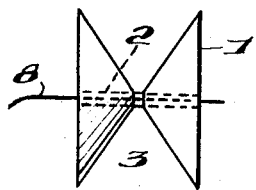
Figure 1B:
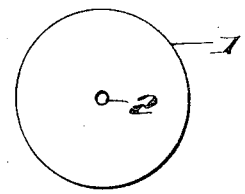

Figure 1 shows the coil frame 1 seen from the side and the end. The frame is provided with an axial through-hole 2 into which the tape 8 is inserted. The through-hole 2 may be shaped with a diameter which is somewhat less than the width of the tape so that this is rolled up laterally during its passage through the hole. The hole, and thus the least diameter of the coil, and therefore the distance between the inside of the coil and the tape, can then be kept as small as possible.

The coil frame is provided on the outside with a double-conical space 3 in which the coil is wound. Due to this design the magnetic field strength of the coil will decrease symmetrically along its axis towards the ends, so that the "erased" length of the tape will be a measurement of the amplitude of the transient voltage.

The frame is constructed from an insulating, nonmagnetic material so that the coil is in the nature of a pure air coil without any disturbing resonances.

Instead of constructing the coil frame in one piece, in which case it must be provided with a hub which sets a limit for the smallest diameter, it can be made of two conical halves which are held together with a central pin while the coil is wound. The coil and the two halves are then cast in plastic, after which the central pin can be removed and the cast coil appears as a solid cylinder with a hole for the tape.

Figure 2:
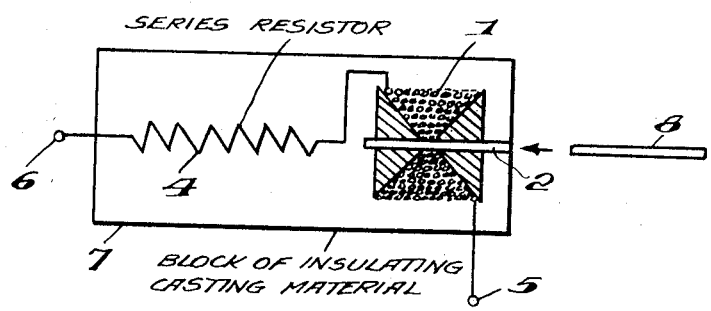

FIG. 2 shows how the coil L, which is wound on the frame 1 in FIG. 1 is connected across a resistor R in an otherwise capacitive voltage divider C, to the network 4 with voltage U. It can be shown that by means of this form of connection the current in the coil will be substantially independent of the frequency and steepness of a transient overvoltage. The current in the coil will therefore be approximately equal to $U \cdot R \cdot C / L$, that is proportional to the amplitude of the voltage and thus also the amplitude of the overvoltage to be recorded.

The tape may either be passed continuously through the frame 1 with low speed or be moved forwards stepwise. At the end of a recording period, the tape is scanned in a playback apparatus which calculates the number of remagnetizations and measures the length of the remagnetized parts. These parts are determined by the amplitude of the flux and thus of the overvoltage and it is therefore possible to obtain a statistical impression of the frequency with which overvoltages occur and their distribution with respect to the amplitude.

FIG. 2 shows how the coil, together with a series resistor, can be constructed as a unit with terminals to connect the device to the network. Preferably the coil 11 with its series resistor 4 are cast in a block 7 of insulating material provided with a hole 2 for the insertion of the tape 8. Since the recording takes place during several short, successive periods, for example lasting one week, the tape may consist of a short strip arranged in a cartridge which is exchanged and read off after each period. In this simple, compact form, the device is not only useful for high voltage, but also for low voltage where, with a suitable choice of series resistor, it is possible to connect the device directly to the phase conductors. The coil 11 may possibly be arranged transversely in the block 7, in which case the hole 2 can be bored straight through the block so that the cartridge 8 can be pushed through the block.

Figure 3:
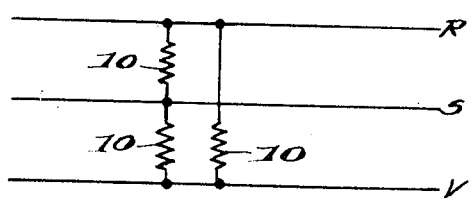
FIG. 3 shows how the member according to the invention is connected between the phase conductors in a network.

FIG. 3 shows a three-phase network RST for low voltage where three units 10 of the type shown in FIG. 2 are connected between the phases. By selecting sufficiently high connecting resistors, the no-load effect is kept at a reasonable value. Also, indication is often carried out temporarily in order during a certain period to get an impression of the occurrence of overvoltages and thus an indication of what precautions should possibly be taken.

I claim:

1. Means for recording overvoltages in a high-voltage network, said means comprising an electromagnetic member which is connected to the network, a magnetic tape influenced from said electromagnetic member, said electromagnetic member comprising a coil wound onto an insulating coil core with an axial hole in the middle through which the tape is passed, said insulating core provided on the outside with an annular space of triangular cross section with the apex of the triangle adjacent the axial hole for the winding, so that the magnetic field strength along the axis of the coil decreases symmetrically towards the ends of the coil, said coil with a series resistor being constructed as a unit with connection terminals for connection to the network.

2. Means according to claim 1, in which the coil and the series resistor are cast in a block of insulating material in which there is a hole for the insertion of the magnetic tape.

* * * * *